(12) United States Patent
Knight et al.

(10) Patent No.: US 10,145,387 B2
(45) Date of Patent: Dec. 4, 2018

(54) COMPRESSOR TIP INJECTOR (71) Applicant: ROLLS-ROYCE plc, London (GB)

(72) Inventors: Glenn A Knight, Derby (GB); Alan R Maguire, Derby (GB); Daniel Robinson, Derby (GB); George Bostock, Derby (GB); Mark J Wilson, Nottingham (GB)

(73) Assignee: ROLLS-ROYCE plc, London (GB)

( * ) Notice: Subject to any disclaimer, the term of this patent is extended or adjusted under 35 U.S.C. 154(b) by 386 days.

(21) Appl. No.: 15/136,409

(22) Filed: Apr. 22, 2016

(65) Prior Publication Data

US 2016/0341215 A1  Nov. 24, 2016

(30) Foreign Application Priority Data

May 19, 2015 (GB) .................................. 1508545.9

(51) Int. Cl.
*F04D 29/52* (2006.01)
*B64D 13/06* (2006.01)
(Continued)

(52) U.S. Cl.
CPC ............ *F04D 29/526* (2013.01); *B64C 21/04* (2013.01); *B64D 13/02* (2013.01); *B64D 13/04* (2013.01);
(Continued)

(58) Field of Classification Search
CPC ........ F04D 19/00; F04D 25/02; F04D 25/028; F04D 27/009; F04D 27/0261; F04D 29/324; F04D 29/526; F04D 29/684; B64D 13/02; B64D 13/04; B64D 13/06; B64D 2013/0618; B64D 2013/0622; B64D 2033/0226; B64D 2033/0286;
(Continued)

(56) References Cited

U.S. PATENT DOCUMENTS 3,596,467 A   8/1971 Avery
3,965,673 A   6/1976 Friedrich
(Continued)

FOREIGN PATENT DOCUMENTS

EP   0934878 A2   8/1999
EP   0 974 515 A2  1/2000
(Continued)

OTHER PUBLICATIONS

Nov. 12, 2015 British Search Report issued in British Patent Application No. 1508545.9.
(Continued)

*Primary Examiner* — Igor Kershteyn
(74) *Attorney, Agent, or Firm* — Oliff PLC (57) ABSTRACT

A gas turbine engine comprising a compressor, a compressor case surrounding the compressor and a compressor tip injector system is disclosed. The compressor tip injector system comprises a cabin blower system comprising a cabin blower compressor arranged in use to compress air used in a cabin of an aircraft and by the compressor tip injector system. The compressor case comprises one or more injectors of the compressor tip injector system through which in use air from the cabin blower compressor is injected towards blade tip ends of blades of the compressor as they rotate.

16 Claims, 3 Drawing Sheets

(51) Int. Cl.
| | |
|---|---|
| *F04D 19/00* | (2006.01) |
| *F04D 27/00* | (2006.01) |
| *F04D 29/32* | (2006.01) |
| *F04D 29/68* | (2006.01) |
| *B64C 21/04* | (2006.01) |
| *B64D 13/02* | (2006.01) |
| *B64D 13/04* | (2006.01) |
| *F16H 15/38* | (2006.01) |
| *F16H 37/08* | (2006.01) |
| *F04D 25/02* | (2006.01) |
| *F04D 27/02* | (2006.01) |
| *B64D 33/02* | (2006.01) |

(52) U.S. Cl.
CPC ............. *B64D 13/06* (2013.01); *F04D 19/00* (2013.01); *F04D 25/02* (2013.01); *F04D 25/028* (2013.01); *F04D 27/009* (2013.01); *F04D 27/0261* (2013.01); *F04D 29/324* (2013.01); *F04D 29/684* (2013.01); *F16H 15/38* (2013.01); *F16H 37/084* (2013.01); *B64D 2013/0618* (2013.01); *B64D 2013/0622* (2013.01); *B64D 2033/0226* (2013.01); *B64D 2033/0286* (2013.01); *F05D 2220/36* (2013.01); *F05D 2270/101* (2013.01); *F16H 37/086* (2013.01); *F16H 2037/088* (2013.01)

(58) Field of Classification Search
CPC ...... F16H 15/38; F16H 37/084; F16H 37/086; F16H 2037/088; B64C 21/04; F05D 2220/36; F05D 2270/101
See application file for complete search history.

(56) References Cited

U.S. PATENT DOCUMENTS

| | | | |
|---|---|---|---|
| 4,178,667 A | 12/1979 | Stevens et al. | |
| 4,514,976 A | 5/1985 | Christoff | |
| 4,738,416 A | 4/1988 | Birbragher | |
| 5,039,032 A * | 8/1991 | Rudolph | B64C 3/10 244/35 R |
| 5,125,806 A | 6/1992 | Quick et al. | |
| 5,136,837 A | 8/1992 | Davison | |
| 5,143,329 A | 9/1992 | Coffinberry | |
| 6,128,896 A | 10/2000 | Saiz | |
| 6,179,251 B1 * | 1/2001 | Tindell | B64C 21/00 244/207 |
| 6,289,665 B1 * | 9/2001 | Saiz | B64C 23/00 244/118.5 |
| 7,152,829 B2 * | 12/2006 | Bertolotti | B64C 21/06 244/209 |
| 7,708,230 B2 * | 5/2010 | Cloft | B64D 33/02 244/207 |
| 7,762,081 B2 * | 7/2010 | Williams | F01D 17/162 60/39.093 |
| 8,011,904 B2 | 9/2011 | Maguire et al. | |
| 8,181,442 B2 | 5/2012 | Youssef | |
| 8,500,583 B2 | 8/2013 | Goi et al. | |
| 8,844,296 B2 | 9/2014 | Barkowsky et al. | |
| 9,796,477 B2 | 10/2017 | Hipsky et al. | |
| 2012/0031501 A1 | 2/2012 | Tuan | |
| 2012/0325978 A1 | 12/2012 | Jain | |
| 2013/0266419 A1 | 10/2013 | Richardson et al. | |
| 2014/0061387 A1 * | 3/2014 | Reckzeh | B64C 9/24 244/208 |

FOREIGN PATENT DOCUMENTS

| | | |
|---|---|---|
| EP | 1 143 167 A2 | 10/2001 |
| EP | 1 388 687 A2 | 2/2004 |
| EP | 1 777 156 A2 | 4/2007 |
| EP | 1 826 460 A1 | 8/2007 |
| EP | 1998029 A2 | 12/2008 |
| EP | 2022947 A2 | 2/2009 |
| EP | 2333282 A2 | 6/2011 |
| EP | 2 591 999 A2 | 5/2013 |
| EP | 2 625 102 A1 | 8/2013 |
| EP | 2644496 A1 | 10/2013 |
| EP | 2 829 706 A1 | 1/2015 |
| EP | 2 871 349 A1 | 5/2015 |
| EP | 3 034 405 A1 | 6/2016 |
| GB | 620 533 A | 3/1949 |
| WO | 95/02120 A1 | 1/1995 |
| WO | 2012/045864 A1 | 4/2012 |

OTHER PUBLICATIONS

Jun. 9, 2015 British Search Report issued in British Patent Application No. 1422027.1.
Oct. 8, 2015 British Search Report issued in British Patent Application No. 1506396.9.
Sep. 24, 2015 British Search Report issued in British Patent Application No. 1506398.5.
U.S. Appl. No. 14/957,972, filed Dec. 3, 2015 in the name of Knight et al.
May 23, 2016 Extended Search Report issued in European Patent Application No. 15197063.9.
Jul. 13, 2016 Search Report issued in British Patent Application No. 1602710.4.
Oct. 3, 2016 Search Report issued in European Patent Application No. 16166360.
Jul. 21, 2016 Search Report issued in British Patent Application No. 1600180.2.
U.S. Appl. No. 15/372,289, filed Dec. 7, 2016 in the name of Knight et al.
May 30, 2017 Search Report issued in European Patent Application No. 16202557.
Goi et al., "Development of Traction Drive IDG(T-IDC®);" Proceedings of International Congress on Continuously Variable and Hybrid Transmissions; Sep. 2007; pp. 1-5.
Sep. 7, 2018 Office Action issued in U.S. Appl. No. 14/957,972.

* cited by examiner

COMPRESSOR TIP INJECTOR

The present disclosure concerns compressor stability. More specifically the disclosure concerns a gas turbine engine, a method of operating a gas turbine engine, an aircraft and a method of operating an aircraft.

In the field of gas turbine turbofan engines lower fan pressure ratios are potentially advantageous because moving more air at a slower rate is a more efficient method of achieving a given thrust. In the field of civil aviation in particular, this is fuelling a drive towards so called low speed fans' of increased diameter. Nonetheless low speed fans are inherently more prone to instability and flutter. Specifically fans with lower pressure ratios have more of their operating envelope in a regime where the exhaust nozzle of the gas turbine engine will be un-choked. When the nozzle is un-chocked it is not operating at maximum capacity and so there is greater variation in fan flow and greater excursion of the fan working line into instability regimes.

There are various traditional ways of overcoming fan instability issues including the provision of a variable area nozzle or a fan having variable blades. A variable area nozzle allows the nozzle aperture size to be tailored to the particular operating point of the fan while variable fan blades allow adjustment of the fan stability line directly. Both solutions add mechanical complexity, cost and weight, increasing failure modes, maintenance requirements and reducing efficiency. Further in the case of a variable area nozzle, a failure of the nozzle whereby its nozzle is fixed at its smallest aperture causes an engine hazard likely necessitating engine shut-down. In the case of a variable fan, a failure of the mechanism leaving the blades in a coarse orientation will increase drag, which may be particularly problematic if the engine is shut-down with the fan windmilling, potentially impacting on aircraft handling and stability.

Although for simplicity the background has been described in the context of gas turbine engine fans, this is not intended to be limiting. The disclosure may have further application in compressors other than fan, for instance in intermediate or high pressure gas turbine engine compressors.

According to a first aspect there is provided a gas turbine engine comprising optionally a compressor, optionally a compressor case surrounding the compressor and optionally a compressor tip injector system, the compressor tip injector system optionally comprising a cabin blower system optionally comprising a cabin blower compressor arranged in use to compress air optionally used in a cabin of an aircraft and optionally by the compressor tip injector system, the compressor case optionally comprising one or more injectors of the compressor tip injector system through which in use air from the cabin blower compressor is optionally injected towards blade tip ends of blades of the compressor as they rotate.

Cabin blower systems are typically designed with significant over-capacity in terms of the requirements of the cabin environmental control system. This is in order that cabin pressurisation can be maintained by an operational cabin blower system in the event of failure of the cabin blower system of another engine (or indeed failure of that engine itself). Further the most excess capacity tends to occur at take-off and descent/landing, which tends to coincide with operation of the engine away from its cruise optimised design point. Compressor stalls, instabilities and blade flutters are more likely to occur away from operation at such design points. Consequently cabin blower compressor air may be available and its use efficient in injecting air towards blade tips of a compressor in order to reduce instabilities etc. Further the compressor tip injector system may negate the need for a variable area nozzle and/or variable fan.

For simplicity, in the following statements of invention, it is assumed that there are multiple injectors. As will be appreciated however, except where mutually exclusive, the features disclosed may be applied to one injector (regardless of whether there is only one injector or there are in fact multiple injectors in the system), some or all injectors in the compressor tip injector system.

In some embodiments the compressor tip injector system comprises a compressor tip injection controller arranged to control operation of the injectors.

In some embodiments one or more of the injectors are upstream injectors located to inject air from upstream of the compressor. At off-design operation of the compressor the on-set of any rotating stall tends to occur towards the blade tips. By re-energising a boundary layer of air approaching and passing over the compressor blade tips with the injected air, the on-set of rotating stall may be delayed or prevented. This in turn may prevent stall and improve efficiency. Furthermore by re-energising the boundary layer, upstream injectors may reduce noise generation. Specifically the re-energised boundary layer may have reduced turbulence and there may therefore be a reduction in turbulent flow interaction with the moving blade tip. Injected air may also serve to fill flow 'gaps' between a blade tip and casing, thereby tending to reduce a turbulent interaction over the tip of the blade.

In some embodiments the compressor tip injector system controller is arranged to selectively variably control air injection from the upstream injectors. The control might for example comprise on/off functionality (e.g. the controller might have authority over actuation of a simple valve for each upstream injector or a plurality of ganged upstream injectors). In this case it may for instance be that the controller activates upstream injection when the compressor and/or engine enters a particular range of operating regimes or in accordance with detection of a particular event (such as compressor stall on-set). Similarly the controller may deactivate upstream injection when the compressor and/or engine enters an alternative range of operating parameters. Alternatively additional degrees of variability in the control may be provided (for instance the controller might have authority over actuation of a variable valve for each upstream injector or a plurality of ganged upstream injectors). In this case it may be that the controller tailors the pressure of upstream injection to a particular operating regime of the compressor and/or gas turbine engine. As will be appreciated the compressor tip injector system may comprise a plurality of sensors arranged to detect engine operating parameters. The detected engine operating parameters may be used by the controller to determine the operating regime of the compressor or gas turbine engine, or to determine the on-set of a particular event.

In some embodiments the compressor tip injector system comprises a plurality of circumferentially distributed upstream injectors. The upstream injectors may be regularly distributed. Additional injectors may increase the degree of control over a stagnant boundary layer adjacent the blade tip ends of the blades, potentially increasing the likelihood of rotating stall on-set at any particular circumferential position.

In some embodiments one or more of the injectors are radial injectors axially aligned with and radially outwards of the blade tips. The flow from such injectors may alter the radial flow and/or pressure distribution of air passing the blade tip. This in turn may alter the balance of aero induced forces on various parts of the blade and may therefore increase blade flutter margin.

In some embodiments the compressor tip injector system controller is arranged to selectively variably control air injection from the radial injectors. The control might for example comprise on/off functionality (e.g. the controller might have authority over actuation of a simple valve for each radial injector or a plurality of ganged upstream injectors). In this case it may for instance be that the controller activates radial injection when the compressor and/or engine enters a particular range of operating regimes or in accordance with detection of a particular event (such as compressor blade flutter). Similarly the controller may deactivate radial injection when the compressor and/or engine enters an alternative range of operating parameters. Alternatively additional degrees of variability in the control may be provided (for instance the controller might have authority over actuation of a variable valve for each radial injector or a plurality of ganged radial injectors). In this case it may be that the controller tailors the pressure of radial injection to a particular operating regime of the compressor and/or gas turbine engine. As will be appreciated the compressor tip injector system may comprise a plurality of sensors arranged to detect engine operating parameters. The detected engine operating parameters may be used by the controller to determine the operating regime of the compressor or gas turbine engine, or to determine the on-set of a particular event.

In some embodiments the controller is arranged to control injection from the radial injectors so that the air injected is pulsed. The rate of pulsing may be determined by the operating regime of the compressor and/or gas turbine engine. The oscillation of the pulse may be regular for any particular operating regime and/or regardless of operating regime. Pulsing air streams may serve to prevent aero-induced forces in the blade that might otherwise give rise to flutter.

In some embodiments the compressor tip injector system comprises a plurality of circumferentially distributed radial injectors. The radial injectors may be regularly distributed. Additional injectors may increase the number of blades that are influenced by the compressor tip injector system.

In some embodiments the cabin blower system further comprises a transmission and the cabin blower compressor is drivable in use via the transmission, the transmission comprising a toroidal continuously variable transmission giving selectively variable control over the rate at which the cabin blower compressor is driven. The transmission may allow variation in the rate at which the cabin blower compressor is driven and so the quantity and/or pressure of air that is generated for use in the cabin and/or injectors. Consequently the performance of the cabin blower compressor can be altered in accordance with the demands of its dependent systems.

In some embodiments the controller is arranged to control the transmission to determine the rate at which the cabin blower compressor is driven in accordance with the requirements for cabin pressurisation and air injection by the injectors.

In some embodiments the toroidal continuously variable transmission comprises at least one traction drive through which in use drive is transmitted, the traction drive comprising first and second toroids, the first and second toroids each having one of a pair of opposed toroidal surfaces and there being a set of rotatable variators disposed between the opposed toroidal surfaces, the first and second toroids are separated and are drivingly engaged via a wheel of each variator, each wheel running in use on both of the opposed toroidal surfaces.

In some embodiments the transmission further comprises a bypass drive transmission parallel to the toroidal continuously variable transmission. The toroidal continuously variable transmission may be a relatively inefficient way of delivering all drive. Thus if a direct bypass drive transmission is also provided, the toroidal continuously variable transmission may be principally used to vary the output of the direct drive. In this way the transmission efficiency may be increased.

In some embodiments the transmission is arranged such that in use drive from the toroidal continuously variable transmission and the bypass drive transmission is combined and delivered to the cabin blower compressor. It may be for example that the drive is combined in a differential planetary gearbox.

In some embodiments drive to the transmission in use is provided by one or more shafts of the gas turbine engine.

In some embodiments the gas turbine engine does not have a variable area nozzle. The provision of the compressor tip injector system may negate the need for a variable area nozzle.

In some embodiments blades of the compressor are not variable. The provision of the compressor tip injector system may negate the need for variable compressor blades.

In some embodiments the compressor is a fan and the compressor case is a fan case. The compressor tip injector system may be particularly effective in improving fan stability.

In some embodiments the fan has a diameter in excess of 55 inches.

According to a second aspect there is provided an aircraft comprising a gas turbine engine according to the first aspect.

In some embodiments the aircraft comprises at least two gas turbine engines according to the first aspect.

In some embodiments the aircraft comprises at least one inter-engine duct via which air compressed by the cabin blower compressor of one of the engines is selectively deliverable to the compressor tip injector system injectors of another of the engines. In this way, if there is a cabin blower compressor failure of one engine, the stability of the compressor of that engine may be maintained by providing cabin blower compressor air from another engine for injection by its injectors.

According to a third aspect there is provided a method of operating an aircraft, the aircraft comprising at least two gas turbine engines according to the first aspect and at least one inter-engine duct via which air compressed by the cabin blower compressor of one of the engines is selectively deliverable to the compressor tip injector system injectors of another of the engines, the method comprising, delivering air from one of the engines having an operational cabin blower compressor to the injectors of the other engine via the inter-engine duct when the cabin blower compressor of that other engine is operating sub-normally and/or is inoperative.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
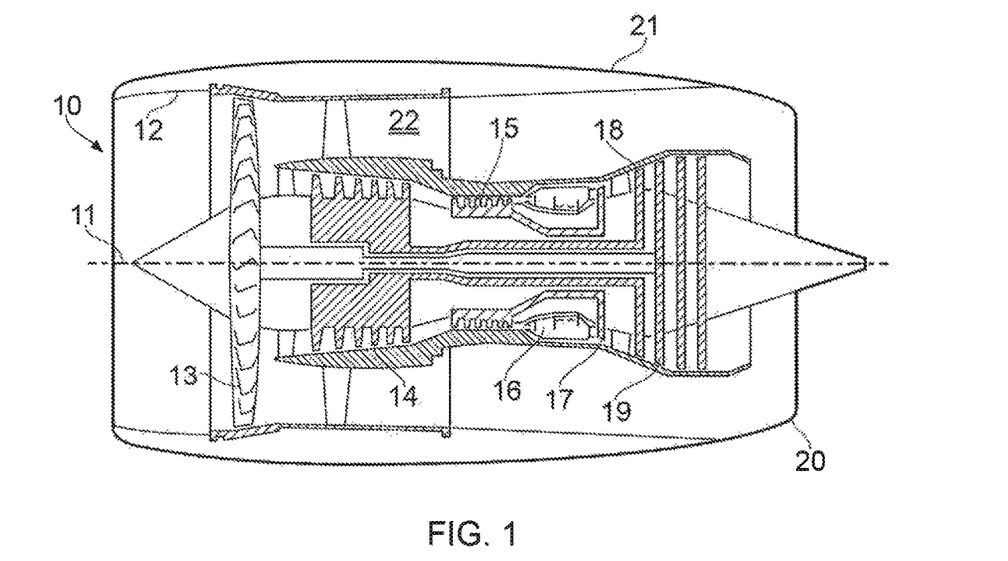
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
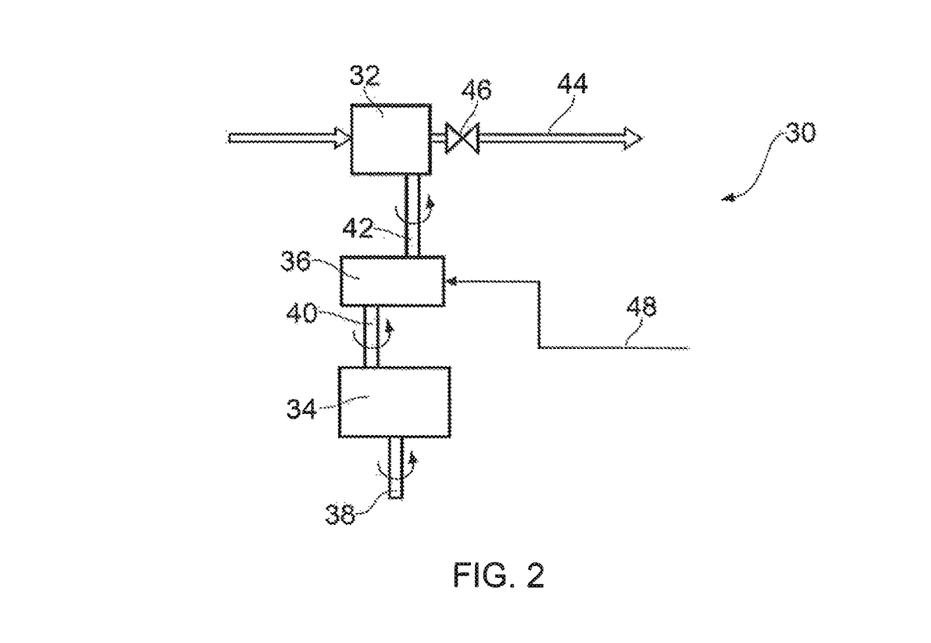
FIG. 2 is a schematic depiction of an aircraft cabin blower system in accordance with an embodiment of the invention.

Referring now to FIG. 2 an aircraft cabin blower system is generally provided to 30.

The cabin blower system 30 has a shaft of a gas turbine engine (not shown) and a cabin blower compressor 32 connected in a driving relationship. In the drive path intermediate the gas turbine engine shaft and cabin blower compressor 32 are an accessory gearbox 34 of the gas turbine engine and a transmission 36. The shaft of the gas turbine engine and the accessory gearbox 34 are drivingly coupled by an accessory gearbox shaft 38. The accessory gearbox 34 and transmission 36 are drivingly coupled by an intermediate shaft 40. The transmission 36 and cabin blower compressor 32 are drivingly coupled by a compressor shaft 42. As will be appreciated, in other embodiments variations to the arrangement above are possible. It may be for instance that the accessory gearbox 34 could be omitted from the drive path and the intermediate shaft 40 drivingly coupling the transmission 36 directly to the shaft of the gas turbine engine.

The cabin blower compressor 32 is disposed in a duct system 44 connecting a scoop (not shown) on an outer wall of a bypass duct (not shown) of the gas turbine engine and aircraft cabin air conditioning outlets (not shown). Between the cabin blower compressor 32 and air conditioning outlets in the duct system 44 is a starter air shut off valve 46. The shut-off valve 46 is arranged to be operable to alternatively allow one of two conditions. In a first condition the valve 46 permits the flow of air from the cabin blower compressor 32 towards the air conditioning outlets and seals communication between the duct system 44 and a starter conduit (not shown). The starter conduit connects the duct system 44 at the location of the valve 46 and a port to atmosphere. In a second condition the valve 46 permits flow from the starter conduit towards the cabin blower compressor 32 and prevents flow towards the air conditioning outlets.

Between the cabin blower compressor 32 and the valve 46 is an array of variable exit guide vanes (not shown) disposed immediately adjacent the cabin blower compressor 32.

The system 30 has both a forward and a reverse configuration which in use allow the system 30 to perform as a cabin blower or as part of a starter system for the gas turbine engine respectively.

In the forward configuration the cabin blower compressor 32 is driven by the gas turbine engine shaft via the accessory gearbox shaft 38, the accessory gearbox 34, the intermediate shaft 40, the transmission 36 and the compressor shaft 42. The cabin blower compressor 32, driven by the gas turbine engine shaft, compresses air collected by the scoop and delivered to the cabin blower compressor 32 via the duct system 44. This compressed air is conditioned by the variable exit guide vanes, positioned accordingly, to convert radial velocity kinetic energy of the air into higher static pressure, allowing it to be turned with less loss. The variability of the exit guide vanes means that a wider range of air flow rates, velocities and pressures can be effectively conditioned. Thereafter the air is delivered by the duct system 44 for regulated use in the cabin of the aircraft via the air conditioning outlets. The starter air shut-off valve 46 is placed in its first condition so as to permit flow towards the air conditioning outlets and to prevent losses to atmosphere via the starter conduit. The rate at which the cabin blower compressor 32 is driven is controlled via the transmission 36, the gearing of which is controlled via a control signal 48 from a controller (not shown).

In the reverse configuration the cabin blower compressor 32 acts as a turbine and drives the gas turbine engine shaft via the compressor shaft 42, transmission 36, intermediate shaft 40, accessory gearbox 34 and accessory gearbox shaft 38. The cabin blower compressor 32 is driven by gas (typically air) supplied from an external source via the starter conduit. With the valve 46 in its second condition gas supplied by the external source is supplied to the cabin blower compressor 32 in order to drive it, while losses to the air conditioning outlets are prevented. The variable exit guide vanes, positioned accordingly, are used to direct the gas delivered via the starter conduit so as to encourage efficient driving of the cabin blower compressor 32 in the opposite direction to its rotation when the system 30 is operating in the forward configuration. Furthermore the transmission 36 is adjusted so that despite the rotation of the cabin blower compressor 32 in the opposite direction to that when the system 30 is operated in the first configuration, the drive direction delivered to the shaft of the gas turbine engine is common to the direction of rotation of the same shaft when the system 30 is operated in the first configuration.

Figure 3:
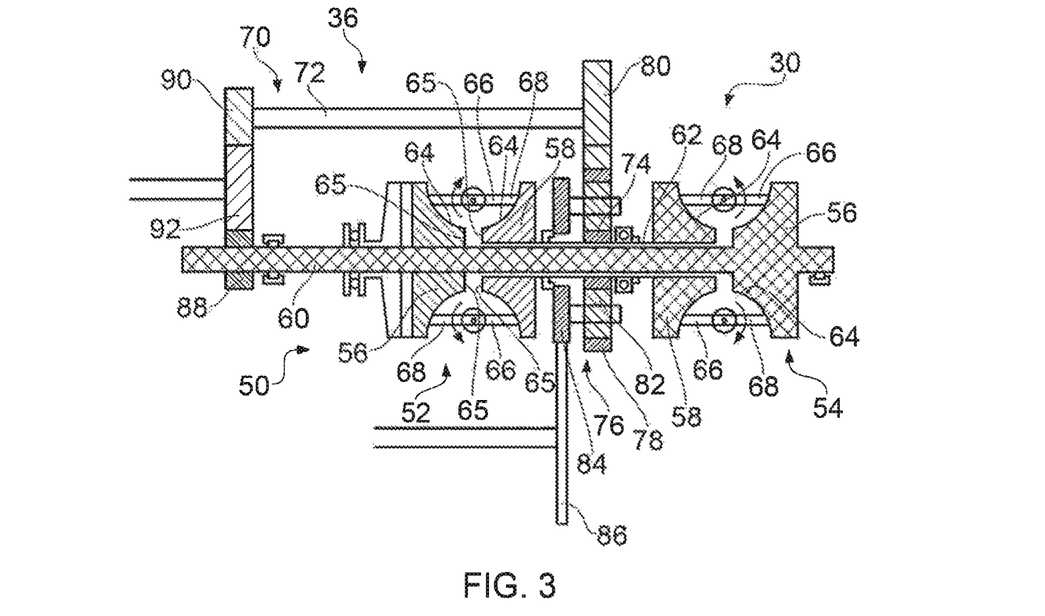
FIG. 3 is a cross-sectional view showing a transmission in accordance with an embodiment of the invention, the transmission being in a forward configuration.
Figure 4:
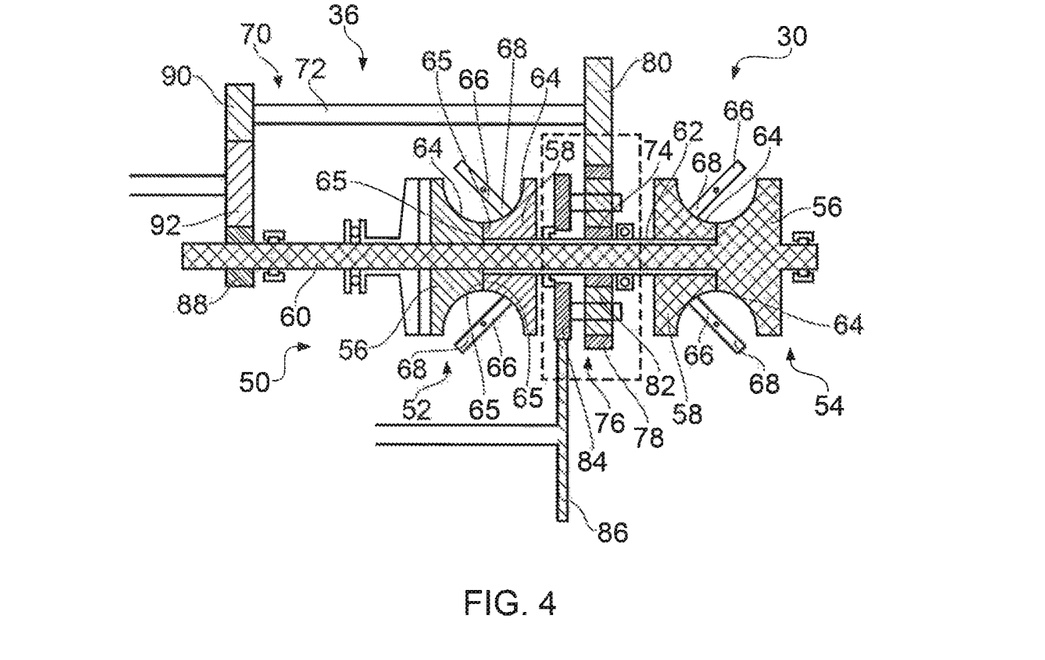
FIG. 4 is a cross-sectional view showing a transmission in accordance with an embodiment of the invention, the transmission being in a reverse configuration.

Referring now to FIGS. 3 and 4 the transmission 36 and in particular it's first (FIG. 3) and second (FIG. 4) configurations are described in more detail.

The transmission 36 has a toroidal continuously variable transmission (CVT) generally provided at 50. The toroidal CVT 50 has first 52 and second 54 traction drives. Each traction drive 52, 54 has first 56 and second 58 toroids. The first toroid 56 of each traction drive 52, 54 is provided on and surrounds a first transmission shaft 60. The second toroid 58 of each traction drive 52, 54 is provided on and surrounds a second transmission shaft 62. The first 60 and second 62 transmission shafts are coaxial and the first transmission shaft 60 passes through the second transmission shaft 62. The first transmission shaft 60 is longer than the second transmission shaft 62 in order to accommodate the first toroids 56 provided thereon.

The first 56 and second 58 toroids of each traction drive 52, 54 define a pair of opposed toroidal surfaces 64 and a pair of opposed parallel engagement surfaces 65. Disposed between the opposed toroidal surfaces 64 of each traction drive 52, 54 are a set of rotatable variators 66 (two per traction drive 52, 54 shown). Each variator 66 has a wheel 68 capable of simultaneously engaging and running on the opposed toroidal surfaces 64 of the respective traction drive 52, 54. Each variator 66 is also rotatable about an axis so as to vary the diameter at which the wheel 68 engages each of the opposed toroidal surfaces 64, increasing the diameter for one and reducing it for the other of the opposed toroidal surfaces 64. Each variator 66 is also rotatable to a degree such that the wheel 68 no longer engages one of the opposed toroidal surfaces 64.

The transmission 36 also has a bypass drive transmission 70 having a bypass transmission shaft 72. The bypass transmission shaft is non-coaxial with the first 60 and second 62 transmission shafts and is radially displaced therefrom. The bypass transmission shaft 72 is however parallel to the first 60 and second 62 transmission shafts.

Provided on the second transmission shaft 62 is a first gear of the transmission 74. The first gear 74 is a sun gear of a differential planetary gearbox 76. A ring gear 78 of the gearbox 76 is engaged with a second gear of the transmission 80 provided on the bypass transmission shaft 72. Between and engaged with the sun gear (first gear 74) and ring gear 78 are a plurality of planet gears 82 supported by a planet carrier gear 84. The planet carrier gear 84 is engaged with a compressor gear 86 of the compressor shaft 42. Consequently the planet carrier gear 84 is engaged with the compressor 36. As will be appreciated, in alternative embodiments the first gear 74, second gear 80 and compressor gear 86 may be or may be engaged with alternative of the gears of the differential planetary gearbox 76 mentioned. Indeed each possible combination is considered in order that increased design freedom is available in terms of selecting fundamental gear ratios.

A third gear of the transmission 88 is provided on the first transmission shaft 60 and a fourth gear of the transmission 90 is provided on the bypass transmission shaft 72. The third gear 88 and fourth gear 90 both engage a common gear 92 provided on the intermediate shaft 40. Both the first transmission shaft 60 and bypass transmission shaft 72 are therefore engaged to the shaft of the gas turbine engine.

Referring specifically now to FIG. 3, the transmission 36 is shown in the forward configuration. In the forward configuration the first 56 and second 58 toroids of each traction drive 52, 54 are axially separated and the wheels 68 of each variator 66 engage both respective opposed toroidal surfaces 64. Consequently the opposed parallel engagement surfaces 65 are axially separated and therefore non-engaged. Power is delivered to the transmission 36 from the shaft of the gas turbine engine via the intermediate shaft 40 and common gear 92. This drives both the first transmission shaft 60 and bypass transmission shaft 72. The first transmission shaft 60 drives the second transmission shaft 62 via the first 56 and second 58 toroids and the variator wheels 68. The bypass transmission shaft 72 and second transmission shaft 62 provide input drive to the gearbox 76 in opposite directions. Output from the gearbox 76 is via its planet carrier gear 84, via which drive is delivered to the cabin blower compressor 32.

As will be appreciated the rate at which the planet carrier gear 84 spins and therefore the rate at which the compressor 32 is turned will depend on the relative input rates to the gearbox 76 from the bypass transmission shaft 72 and the second transmission shaft 62. These relative rotation rates will determine the combined drive rate outputted via the planet gears 82. Thus because the input from the second transmission 62 is variable in accordance with the rotational position of the variators 66, the rate at which the cabin blower compressor 32 is spun is selectively variable. Control over the rotational position of the variators 66 is in accordance with signals 48 from the controller (not shown). Specifically the signals will determine the position to which the variators 66 are rotated and therefore the diameter of the respective opposed toroidal surfaces 64 at which the wheels 68 engage. The rotation therefore allows adjustment to be made to the gearing between the toroids 56, 58. The signals sent by the controller are in accordance with cabin air conditioning and pressurisation requirements. Because the toroidal CVT 50 is effectively used to modify the drive provided by the bypass drive transmission 70, power transmission may be more efficient than if power was transmitted exclusively via the toroidal CVT 50.

Referring specifically now to FIG. 4, the transmission 36 is shown in the reverse configuration. In the reverse configuration the first 56 and second 58 toroids of each traction drive 52, 54 are in direct engagement via their opposed parallel engagement surfaces 65. As will be appreciated the first 56 and second 58 toroids of each traction drive 52, 54 have been forced together by comparison with their position in the first configuration (FIG. 3). In order to achieve this the variators 66 are rotated so as their wheels 68 no longer engage the first toroid 56 in each traction drive 52, 54 and so as the rotation is sufficient such that the variators 66 would no longer impede the closing of the axial gap between the toroids 56, 58. Thereafter the toroids 56, 58 of each variator 66 are moved together and forced into a resilient engagement at their opposed parallel engagement surfaces 65 by an end load delivery system 94 comprising a hydraulically actuated piston. Power is delivered to the transmission 36 from the cabin blower compressor 32 driven by an external source of gas and acting as a turbine. Power from the cabin blower compressor 32 is delivered via the compressor shaft 42 and compressor gear 86 to the planet carrier gear 84 and into the gearbox 76. The gearbox 76 drives the second transmission shaft 62 and bypass transmission shaft 72. The second transmission shaft 62 drives the first transmission shaft 60 via the rotationally locked toroids 56, 58 of each traction drive 52, 54. The first transmission shaft 60 and bypass transmission shaft 72 drive the gear of the gas turbine engine via the common gear 92 and intermediate shaft 40. In this way the shaft of the gas turbine engine can be turned and air delivered to combustors before fuel is delivered and ignited.

As will be appreciated, after engine start, the system 30 can be returned to the forward configuration for delivering pressurised cabin air by driving the toroids 56, 58 apart using the end load delivery system 94. Thereafter the variators 66 are rotated so as the wheels 68 are orientated for engagement with both opposed toroidal surfaces 64 before the end load delivery system 94 drives the toroids 56, 58 towards each other until the wheels 68 engage both toroids. As will be appreciated, further temporary separation of the toroids 56, 58 by the end load delivery system 94 may be desirable and/or necessary before the variators 66 are re-oriented so as to be primed for engagement of the engagement surfaces 65 and operation of the system 30 in the reverse configuration.

Figure 5:
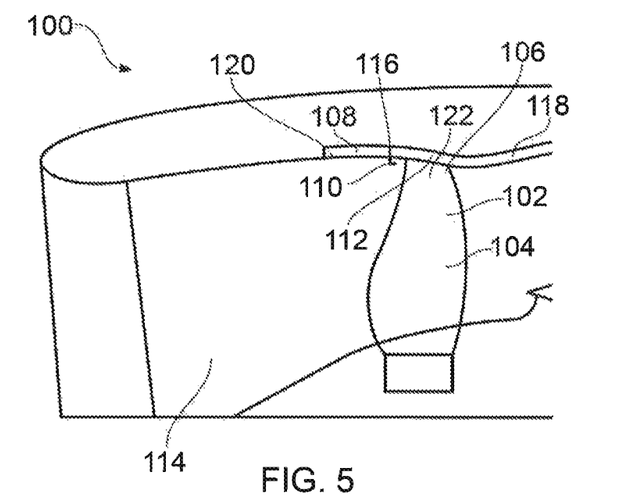
FIG. 5 is a cross-sectional view showing a portion of a gas turbine engine in accordance with an embodiment of the invention.

Referring now to FIG. 5 a portion of a gas turbine engine (in this case a turbofan) 100 is shown. The gas turbine engine 100 has a compressor (in this case a fan 102) comprising a plurality blades 104. Each blade 104 has a blade tip end 106. Surrounding the fan 102 is a compressor case (in this case a fan case 108). The fan case 108 has a plurality of evenly circumferentially distributed upstream injectors 110 and a plurality of evenly circumferentially distributed radial injectors 112.

The upstream injectors 110 extend into an intake duct 114 of the gas turbine engine 100 upstream of the fan 102. The upstream injectors 110 are directed axially rearward and towards a respective blade tip end 106 of a blade 104 when circumferentially aligned with the upstream injector 110. The upstream injectors 110 are provided at the radially outer periphery of the intake duct 114 and in use of the gas turbine engine 100 are in a boundary layer adjacent the fan case 108. Each upstream injector 110 is in fluid connection with an upstream injector manifold 116 which in turn is in fluid communication with an injector delivery line 118. An upstream injector variable valve (not shown) is provided between the injector delivery line 118 and the upstream injector manifold 116.

The radial injectors 112 are flush with an internal wall 120 of the fan case 108, are directed radially inwards and are axially aligned with and directed towards a respective blade tip end 106 of a blade 104 when circumferentially aligned with the radial injector 112. Each upstream injector 110 is in fluid communication with a radial injector manifold 122 which in turn is in fluid communication with the injector delivery line 118. A radial injector variable valve (not shown) is provided between the injector delivery line 118 and the radial injector manifold 122. The radial injector variable valve is capable of selectively fluidly isolating the radial injector manifold 122 from the injector delivery line 118 and upstream injector manifold 116. Similarly the upstream injector variable valve is capable of selectively fluidly isolating the upstream injector manifold 116 from the injector delivery line 118 and radial injector manifold 122.

The injector delivery line 118, travelling via the fan case 108, is in fluid communication with the duct system 44 of FIG. 1 at a bifurcation (not shown). The bifurcation is provided between the starter air shut off valve 46 and the cabin air conditioning outlets. Further provided in the injector delivery line 118 is an injector valve (not shown).

In use the upstream 110 and radial 112 injectors are selectively fed with air compressed by the cabin blower compressor 32 via the injector delivery line 118. The cabin blower system 30 therefore forms part of a broader compressor tip injector system.

More specifically, when the cabin blower system 30 is operating in the reverse configuration for engine start air is not delivered to the tip injectors 110, 112 because the starter air shut off valve 46 prevents air delivered by the external source from travelling towards the cabin air conditioning outlets and injectors 110, 112.

When however the cabin blower system 30 is operated in the forward configuration the controller selectively actuates the variable bifurcation valve anywhere between and including sealing the injector delivery line 118 as previously described and fully opening fluid communication between the duct system 44 and the injector delivery line 118. The controller actuates the variable bifurcation valve in accordance with fan tip injection requirements. Rotation of the variators 66 (to alter the rate at which the cabin blower compressor 32 is driven) is also controlled by the controller, not only in accordance with cabin air conditioning and pressurisation requirements, but also in accordance with fan tip injection requirements. The controller may therefore be thought of as both a compressor tip injection controller and a cabin blower controller.

Compressed air passing along the injector delivery line 118 can be routed to the upstream injector manifold 116 and upstream injectors 110 and/or to the radial injector manifold 122 and radial injectors 112. Control over the distribution is performed by the controller actuating the upstream injector variable valve and radial injector variable valve. In view of the variable nature of both the upstream injector variable valve and radial injector variable valve, the controller can selectively vary the flow to the upstream injectors 110 and radial injectors 112 in accordance with, for example, the fan and/or engine operating regime. As will be appreciated, by suitably controlling the upstream injector variable valve and radial injector variable valve, the injected air to one, other or both sets of injectors 110, 112 may be pulsed.

Figure 6:
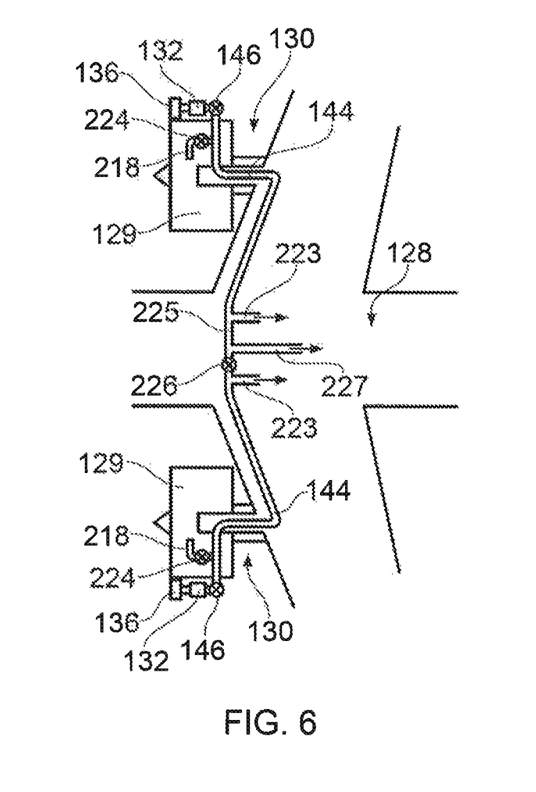
FIG. 6 is a schematic depiction of an aircraft comprising an inter-engine duct in accordance with an embodiment of the invention.

Referring now to FIG. 6 part of aircraft is generally shown at 128. The aircraft 128 has two gas turbine engines 129. Each engine 129 is associated with a cabin blower system 130 and broader compressor tip injector system as previously described. Each engine 129 therefore has a cabin blower compressor 132, a transmission 136 and a duct system 144 all as previously described. As before a starter air shut-off valve 146 is provided in each duct system 144. Further an injector deliver line 218 in fluid communication with the duct system 144 at a bifurcation intermediate the air shut-off valve 146 and cabin air conditioning outlets 223. As previously the injector delivery line 218 is provided with an injector valve 224.

Linking the duct systems 144 associated with each engine 129 in fluid communication is an inter-engine duct 225. The inter-engine duct 225 is provided with a cross flow valve 226. An auxiliary power unit duct 227 is in fluid communication with the inter-engine duct 225.

In use the inter-engine duct 225 allows air compressed by the cabin blower compressor 132 of one of the engines 129 to deliver air to the tip injector system injectors of the other engine 129. The controller selectively controls such delivery via the cross flow valve 226. Thus where for example there is a failure or other operational constraint of one engine 129 or the associated cabin blower system 130 in such a manner that air might still be usefully supplied to its injectors from the other engine 129, the cross flow valve may be actuated by the controller to deliver such air from the cabin blower compressor 132 of the other engine 129. Otherwise the cross flow valve 226 may be maintained closed.

The cabin blower compressor 132 of each engine 129 is arranged such that the compressor tip injector system of one engine 129 has sufficient capacity to meet all normal supply demands of its tip injectors and the tip injectors of the further engine 129. This fact in combination with the provision of the inter-engine duct 225 may provide an additional degree of redundancy over fan stability systems based on a variable area nozzle.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a compressor, a compressor case surrounding the compressor and a compressor tip injector system, the compressor tip injector system comprising a cabin blower system comprising a cabin blower compressor arranged in use to compress air used in a cabin of an aircraft and by the compressor tip injector system, the compressor case comprising one or more injectors of the compressor tip injector system through which in use air from the cabin blower compressor is injected towards blade tip ends of blades of the compressor as they rotate.

2. The gas turbine engine according to claim 1 where one or more of the injectors are upstream injectors located to inject air from upstream of the compressor.

3. The gas turbine engine according to claim 2 where the compressor tip injector system comprises a plurality of circumferentially distributed upstream injectors.

4. The gas turbine engine according to claim 1 where one or more of the injectors are radial injectors axially aligned with and radially outwards of the blade tips.

5. The gas turbine engine according to claim 4 where the compressor tip injector system comprises a compressor tip injection controller the controller being arranged to control injection from the radial injectors so that the air injected is pulsed.

6. The gas turbine engine according to claim 1 where the cabin blower system further comprises a transmission and the cabin blower compressor is drivable in use via the transmission, the transmission comprising a toroidal continuously variable transmission giving selectively variable control over the rate at which the cabin blower compressor is driven.

7. The gas turbine engine according to claim 6 where the toroidal continuously variable transmission comprises at least one traction drive through which in use drive is transmitted, the traction drive comprising first and second toroids, the first and second toroids each having one of a pair of opposed toroidal surfaces and there being a set of rotatable variators disposed between the opposed toriodal surfaces, the first and second toroids are separated and are drivingly engaged via a wheel of each variator, each wheel running in use on both of the opposed toroidal surfaces.

8. The gas turbine engine according to claim 6 where the transmission further comprises a bypass drive transmission parallel to the toroidal continuously variable transmission.

9. The gas turbine engine according to claim 8 where the transmission is arranged such that in use drive from the toroidal continuously variable transmission and the bypass drive transmission is combined and delivered to the cabin blower compressor.

10. The gas turbine engine according to claim 6 where drive to the transmission in use is provided by one or more shafts of the gas turbine engine.

11. The gas turbine engine according to claim 1 where the gas turbine engine does not have a variable area nozzle.

12. The gas turbine engine according to claim 1 where the blades of the compressor are not variable.

13. The gas turbine engine according to claim 1 where the compressor is a fan and the compressor case is a fan case.

14. An aircraft comprising a gas turbine engine according to claim 1.

15. The aircraft according to claim 14 where the aircraft comprises at least two gas turbine engines according to 1 and the aircraft comprises at least one inter-engine duct via which air compressed by the cabin blower compressor of one of the engines is selectively deliverable to the compressor tip injector system injectors of another of the engines.

16. A method of operating an aircraft, the aircraft comprising at least two gas turbine engines according to claim 1 and at least one inter-engine duct via which air compressed by the cabin blower compressor of one of the engines is selectively deliverable to the compressor tip injector system injectors of another of the engines, the method comprising, delivering air from one of the engines having an operational cabin blower compressor to the injectors of the other engine via the inter-engine duct when the cabin blower compressor of that other engine is operating sub-normally and/or is inoperative.

* * * * *